United States Patent [19]
Linke et al.

[11] 3,954,297
[45] May 4, 1976

[54] VEHICLE VISOR MOUNTED RETRACTABLE GLARE SHIELD

[76] Inventors: Wilbur F. Linke; Alice L. Linke, both of 31-4th Place, Victory Village, Mankato, Minn. 56001

[22] Filed: Feb. 28, 1975

[21] Appl. No.: 554,392

[52] U.S. Cl. ............................ 296/97 C; 224/29 A
[51] Int. Cl.² ........................................ B60J 3/02
[58] Field of Search .............. 296/97 C, 97 B, 97 D, 296/97 R; 224/29 A, 42.46 R, 42.46 A, 42.45 B, 42.1 C, 42.1 CA, 46 R

[56] References Cited
UNITED STATES PATENTS

| | | | |
|---|---|---|---|
| 2,831,726 | 4/1958 | Ralston | 296/97 C |
| 2,881,926 | 4/1959 | Spence | 224/29 A UX |
| 2,892,578 | 6/1959 | Sickrey | 224/46 R |
| 3,206,244 | 9/1965 | Kurvinik | 296/97 C |
| 3,351,375 | 12/1967 | Wheeler | 296/97 R |
| 3,369,837 | 2/1968 | Metier | 296/97 C |

FOREIGN PATENTS OR APPLICATIONS

| 1,452,833 | 9/1966 | France | 296/97 C |
|---|---|---|---|

*Primary Examiner*—Robert J. Spar
*Assistant Examiner*—Donald W. Underwood
*Attorney, Agent, or Firm*—Clarence A. O'Brien; Harvey B. Jacobson

[57] ABSTRACT

A pair of spaced apart parallel arms are provided with backturned clamp hooks on one pair of corresponding ends thereof. The other pair of corresponding arm ends are interconnected by means of a brace extending and secured therebetween. The clamp hook-equipped arm ends may be clampingly engaged with the free swinging longitudinal marginal portion of a vehicle sun visor at points spaced longitudinally along the sun visor and with the remote ends of the arms underlying the sun visor and extending toward the other longitudinal edge thereof. One longitudinal edge portion of a transparent and light-filtering panel has longitudinally spaced portions thereof pivotally supported from the clamp hook-equipped ends of the arms on the sides thereof remote from the backturned clamp hooks for swinging movement of the panel between an extended position disposed at generally 90° relative to the arms and a stored position closely overlying the arms, the free marginal edge portion of the panel and the ends of the arms remote from the clamp hook-equipped ends including mutually magnetically attractable portions whereby the transparent light-filtering panel may be magnetically retained in a stored position closely underlying the associated sun visor.

7 Claims, 5 Drawing Figures

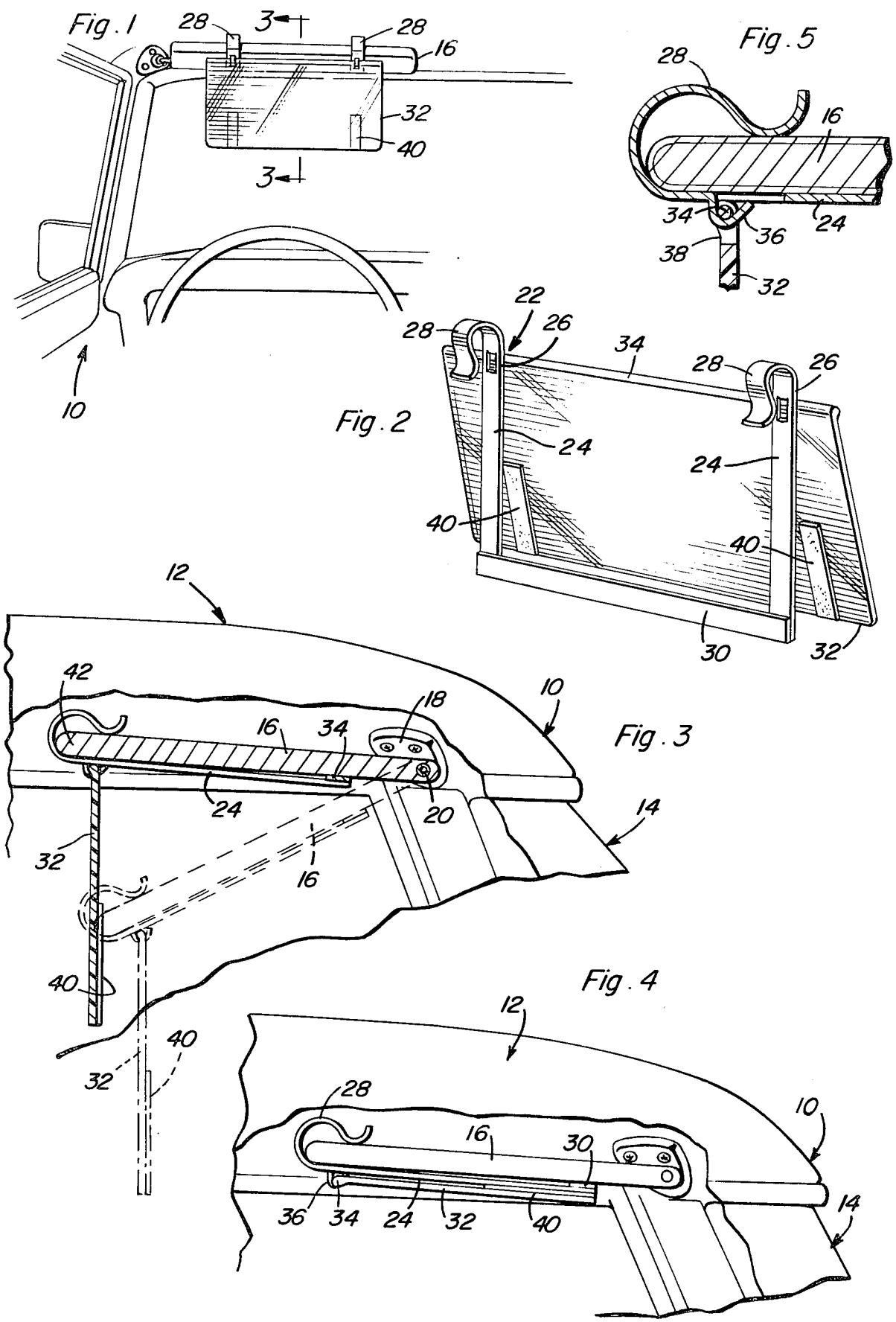

VEHICLE VISOR MOUNTED RETRACTABLE GLARE SHIELD

BACKGROUND OF THE INVENTION

Heretofore various types of light-filtering glare shields have been provided to assist the vision of the driver of a vehicle driving toward an intense light source such as a rising or setting sun. These various types of glare shields have included light-filtering panels secured directly to the windshield of an associated vehicle, tinted upper marginal windshield portions and variously retractable transparent tinted panels supported from the swingable sun visors provided on some motor vehicles. However, these various types of glare shields or filtering devices are not always 100% effective in a given driving situation.

BRIEF DESCRIPTION OF THE INVENTION

The visor mounted retractable glare shield of the instant invention includes a mounting structure which may be readily removably secured to the free swinging longitudinal edge portion of a pivotally mounted vehicle sun visor and includes a tinted light-filtering panel having one longitudinal edge portion thereof pivotally supported from the mounting structure closely adjacent the free longitudinal edge portion of the attendant sun visor and the light-filtering panel and mounting assembly or bracket include coacting mutually magnetically attractable portions thereof for magnetically securing the light-filtering panel in a position closely underlying the underside of the attendant sun visor.

By mounting the light-filtering panel portion of the glare shield in a pivotable manner from the free longitudinal edge portion of an associated pivotally mounted sun visor, when the light-filtering panel of the glare shield is in a depending operative position the elevation of the light-filtering panel may be readily varied merely by pivoting the sun visor from which the light-filtering panel is supported. If the associated sun visor is in a generally horizontally disposed position closely underlying the inner surface of the adjacent roof portions of the associated vehicle, the glare shield is elevated to a position in substantially horizontal alignment with the upper marginal edge portion of the associated windshield. However, if the associated sun visor is swung to a depending position, the light-filtering panel of the glare shield is lowered considerably for viewing therethrough by short persons whose line of forward vision may be only slightly above the upper rim of the associated steering wheel.

The main object of this invention is to provide a retractable glare shield for the driver of a motor vehicle and which may be quickly releasably shifted to a fully retracted out-of-the-way position whenever desired.

Another object of this invention, in accordance with the immediately preceding object, is to provide a glare shield which, when in the operative position, may be readily adjusted in elevation according to the elevation of the forward line of sight of the operator of the associated vehicle.

Yet another object of this invention is to provide a vehicle visor mounted retractable glare shield in accordance with the above objects and constructed in a manner whereby it may be readily removably supported from the associated vehicle sun visor of substantially all types of vehicles.

A final object of this invention to be specifically enumerated herein is to provide a glare shield in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary perspective view of the left-hand side of the windshield of a conventional passenger motor vehicle as seen from the interior of the latter and with the glare shield of the instant invention supported from the left-hand sun visor in an operative position with the light-filtering panel thereof substantially vertically disposed and adjusted upwardly to its substantially uppermost position;

FIG. 2 is a perspective view of the retractable glare shield of the instant invention;

FIG. 3 is an enlarged fragmentary vertical sectional view taken substantially upon the plane indicated by the section line 3—3 of FIG. 1, an alternate slightly lowered position of the light-filtering panel of the glare shield being illustrated in phantom lines;

FIG. 4 is a fragmentary side elevational view of the forward top portion of the associated vehicle with portions of the near side thereof broken away and the glare shield and associated sun visor in a substantially fully upwardly retracted position; and FIG. 5 is an enlarged fragmentary vertical sectional view of the left-hand portion of the sun visor illustrated in FIG. 3 and the adjacent components of the glare shield.

DETAILED DESCRIPTION OF THE INVENTION

Referring now more specifically to the drawings the numeral 10 generally designates a conventional form of passenger motor vehicle having a roof or top assembly 12 terminating forwardly in a forwardly and downwardly inclined windshield assembly 14.

The vehicle 10 includes a conventional form of sun visor 16 which is generally rectangular in configuration and is swingably and pivotally supported from a mount 18 secured to the inner side of the roof or top assembly 12 at the upper left-hand corner of the windshield assembly 14. The sun visor 16 is pivotally supported from the mount 18 as at 20 for swinging about a horizontal axis extending along the forward marginal edge portion of the sun visor 16.

The glare shield of the instant invention is referred to in general by the reference numeral 22 and includes a pair of generally parallel support arms 24 including one pair of ends 26 terminating in backturned spring hook portions 28. The other pair of ends of the support arms 24 are interconnected by means of a bracing bar 30 extending and secured therebetween.

A transparent but tinted and light-filtering panel 32 has one thickened longitudinal edge portion 34 pivotally supported from the ends of the support arms 24 from which the backturned spring hooks 28 are supported by means of tongue portions 36 struck from intermediate portions of the support arms 24 and passed through openings 38 formed in the panel 32 immediately adjacent the thickened longitudinal edge portion 34 at points spaced therealong. The tongue portions 36 are contoured so as to define pivot journals and in this manner the panel 32 is swingably supported from the ends of the support arms 24 which have the backturned spring clamps 28 formed integrally therewith.

The free swinging longitudinal marginal edge portion of the panel 32 remote from the edge portion 34 is provided with strips 40 of magnetic material and the support arms 24 are constructed of ferrous material whereby the strips 40 will be magnetically attracted to the support arms 24. Thus, the panel 32 may be swung to a position closely overlying and in magnetic engagement with the sides of the arms 24 remote from the sides thereof from which the back-turned spring clamps 28 project.

As may be readily understood from FIGS. 3 and 4 of the drawings, the mounting assembly for the glare shield consisting of the arms 24, the back-turned spring clamps 28 and the transverse brace 30 may be removably clampingly engaged with the sun visor 16 in a manner such that the support arms 24 closely underlie the undersurface of the support arms 16 and the spring clamps 28 embracingly engage the free swinging marginal edge portion of the pivotally supported sun visor 16.

As may best be seen from FIG. 4 of the drawings, the panel 32 may be magnetically retained in an upwardly retracted position closely underlying the support arms 24. However, when it is desired to use the light-filtering panel 32 of the glare shield 22, the free edge portion of the panel 32 is pulled down slightly from engagement with the adjacent ends of the support arms 24 to disrupt the magnetic attraction between the strips 40 and the arms 24 whereby the panel 32 will swing to the solid line position thereof illustrated in FIG. 3 of the drawings depending vertically downwardly from the ends of the support arms 24 adjacent the free marginal edge 42 of the sun visor 16. When thus positioned, the light-filtering panel 32 is disposed substantially in its uppermost position and is thus positioned in alignment with the forward line of vision of a tall person driving the vehicle 10. However, if the person driving the vehicle 10 is not extremely tall, the sun visor 16 may be swung downwardly to or beyond the phantom line position thereof illustrated in FIG. 3 so as to lower the light-filtering panel 32 into alignment with his forward line of vision. Of course, any time it is desired to shift the light-filtering panel 32 of the glare shield 22 to the inoperative position, it is merely necessary to upwardly and forwardly swing the free marginal edge portion of the panel 32 until the strips 40 are sufficiently adjacent the support arms 24 to enable the magnetic attraction between the strips 40 and the support arms 24 to magnetically retain the light-filtering panel 32 in the inoperative position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a pair of generally parallel support arms, elongated brace means extending between and interconnecting one pair of corresponding ends of said support arms, the other pair of corresponding end portions of said arms including clamp means for removably clampingly engaging the free swingable longitudinal edge portion of an elongated vehicle sun visor in selected position therealong with said support arms supported from said visor and underlying and extending transversely of the undersurface thereof toward the other longitudinal edge portion thereof when the visor is in a raised generally horizontal position, a generally planar transparent and light-filtering panel having one generally straight marginal edge portion and a second edge portion opposite said one marginal edge portion, said other pair of end portions of said support arms and said one marginal edge portion of said panel including coacting mounting means pivotally supporting said one marginal portion from said support arms for oscillation of said panel relative to said other pair of end portions of said support arms, said one pair of end portions of said support arms and predetermined portions of said second edge portion including coacting magnetically attractable means, said panel being swingable relative to said support arms to a position closely paralleling the latter with said coacting magnetically attractable means at least in close juxtaposition and said second edge portion of said panel magnetically biased against swinging away from said one pair of end portions of said arms.

2. The combination of claim 1 wherein said clamp means includes integral C-shaped clamp members on said other pair of ends of said support arms opening along the latter toward said one pair of corresponding end portions thereof.

3. The combination of claim 1 wherein said support arms are constructed of ferrous material and said magnetically attractable means include magnetic strips secured to those portions of said panel swingable into juxtaposition with said one pair of ends of said support arms.

4. The combination of claim 3 wherein said clamp means includes integral C-shaped clamp members on said other pair of ends of said support arms opening along the latter toward said one pair of corresponding ends thereof.

5. In combination, a pair of generally parallel support arms, elongated brace means extending between and interconnecting one pair of corresponding ends of said support arms, the other pair of corresponding end portions of said arms including clamp means for removably clampingly engaging the free swingable longitudinal edge portion of an elongated vehicle sun visor with said support arm supported from said visor and underlying and extending transversely of the undersurface thereof toward the other longitudinal edge portion thereof when the visor is in a raised generally horizontal position, a generally planar transparent and light-filtering panel having one generally straight marginal edge portion and a second edge portion opposite said one marginal edge portion, said other pair of end portions of said support arms and said one marginal edge portion of said panel including coacting mounting means pivotally supporting said one marginal portion from said support arms for oscillation of said panel relative to said other pair of end portions of said support arms, said one pair of end portions of said support arms and predetermined portions of said second edge portion including coacting magnetically attractable means, said panel being swingable relative to said support arms to a position closely paralleling the latter with said coacting magnetically attractable means at least in close juxtaposition and said second edge portion of said panel magnetically biased against swinging away from said one pair of end portions of said arms, said coacting mounting means including laterally outwardly struck journal portions carried by said other pair of ends of said support arms and longitudinally spaced openings formed in said one marginal edge portion defining boundary pin portions engaged by and oscillatably supported from said journal portions.

6. The combination of claim 5 wherein said support arms are constructed of ferrous material and said magnetically attractable means include magnetic strips secured to those portions of said panel swingable into juxtaposition with said one pair of ends of said support arms.

7. The combination of claim 6 wherein said clamp means includes integral C-shaped clamp members on said other pair of ends of said support arms.

* * * * *